US006931101B1

(12) United States Patent
Wildfeuer (10) Patent No.: US 6,931,101 B1
(45) Date of Patent: Aug. 16, 2005

(54) METHOD AND APPARATUS FOR INBAND TESTING OF AN ECHO CANCELLER (75) Inventor: Herbert M. Wildfeuer, Santa Barbara, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/579,719

(22) Filed: May 26, 2000

(51) Int. Cl.[7] ............................................. H04B 3/23
(52) U.S. Cl. ............... 379/3; 379/406.02; 379/406.04; 370/286
(58) Field of Search ........................... 379/3, 406.01, 379/406.16; 370/241 T, 286–289

(56) References Cited

U.S. PATENT DOCUMENTS

| | | | | |
|---|---|---|---|---|
| 4,918,685 A | * | 4/1990 | Tol et al. | |
| 5,274,705 A | * | 12/1993 | Younce et al. | 379/406.08 |
| 5,533,121 A | * | 7/1996 | Suzuki et al. | 379/406.02 |
| 5,745,564 A | * | 4/1998 | Meek | 379/406.08 |
| 6,011,783 A | * | 1/2000 | Interrante et al. | 370/286 |
| 6,400,802 B1 | * | 6/2002 | Legare | 379/3 |
| 6,487,200 B1 | * | 11/2002 | Fraser | 370/389 |
| 6,751,761 B1 | * | 6/2004 | Tendo | 714/716 |

OTHER PUBLICATIONS

Telecommunication Standardization Sector of International Telecommunication Union, Recommendation G.165, Rev. Mar. 1993.
Telecommunication Standardization Sector of International Telecommunication Union, Recommendation P.501, Rev. Aug. 1996.
Telecommunication Standardization Sector of International Telecommunication Union, Recommendation G.168, Rev. Apr. 1997.

* cited by examiner

Primary Examiner—Sinh Tran
Assistant Examiner—Daniel Swerdlow
(74) Attorney, Agent, or Firm—Marger Johnson & McCollom, P.C.

(57) ABSTRACT

Provided is a method and apparatus for inband testing of an echo canceller. The apparatus includes a signal generator for generating an excitation signal including a preamble portion and a test portion. The echo canceller receives the excitation signal at a decoder. The decoder differentiates the preamble from the test portion and obtains control information by decoding the preamble portion. A controller configures the echo canceller during testing according to the control information obtained from the preamble portion. A strength of the present invention is that the preamble portion allows precise control of the echo canceller during testing by synchronizing the test control to the location of the preamble. This allows exacting control of the echo canceller during testing to within a single sample time of the excitation signal, e.g., 125 microseconds. The control information includes any of the following: instructions related to the management of the H-register, instructions related to the management of the non-linear processor, instructions related to an adaptation function in the echo canceller, and timing information related to any of the aforementioned instructions. The preamble further identifies the test to be performed on the echo canceller and the type of test portion.

75 Claims, 7 Drawing Sheets

METHOD AND APPARATUS FOR INBAND TESTING OF AN ECHO CANCELLER

BACKGROUND OF THE INVENTION

1. Field of the Invention

The invention relates generally to a system for testing performance of a telephone network echo canceller and, more specifically, to a system for inband testing of an echo canceller.

2. Description of the Prior Art

Figure 1:
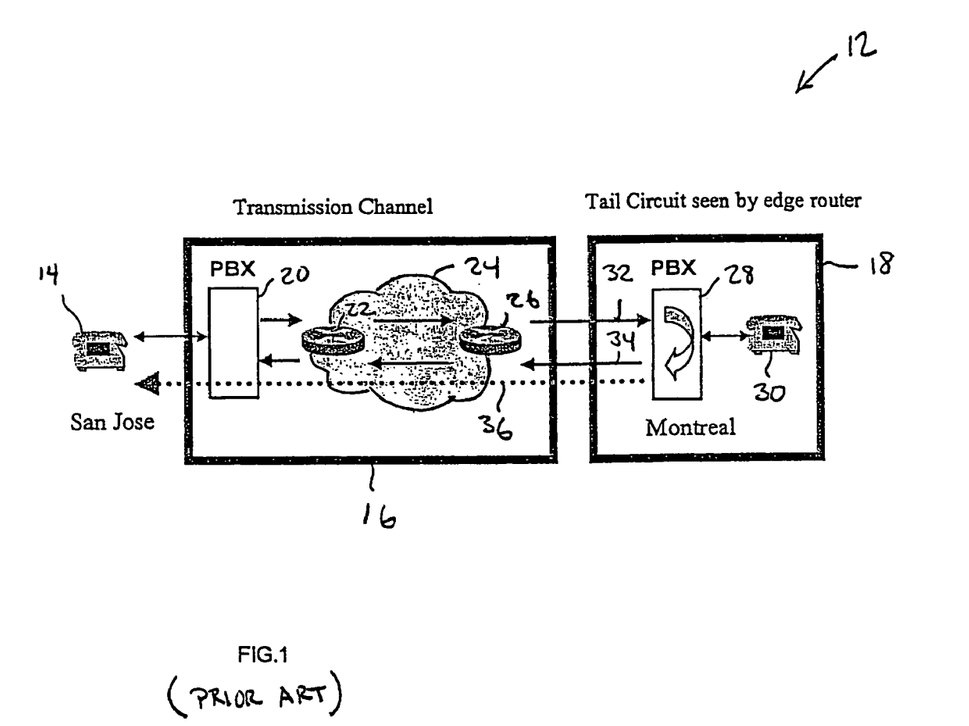
FIG. 1 is a prior art diagram of a telephone network.

FIG. 1 is a schematic of a packet-based telephone system 12. A telephone 14 is coupled through a transmission channel 16 to a tail circuit 18. The transmission channel 16 includes a Public Branch Exchange (PBX) 20 that couples the telephone 14 to a voice packet gateway 22 in a packet-switched network 24. Another voice packet gateway 26 at another location in the packet-switched network 24 is connected through a PBX 28 to a telephone 30 in the tail circuit 18.

Figure 4:
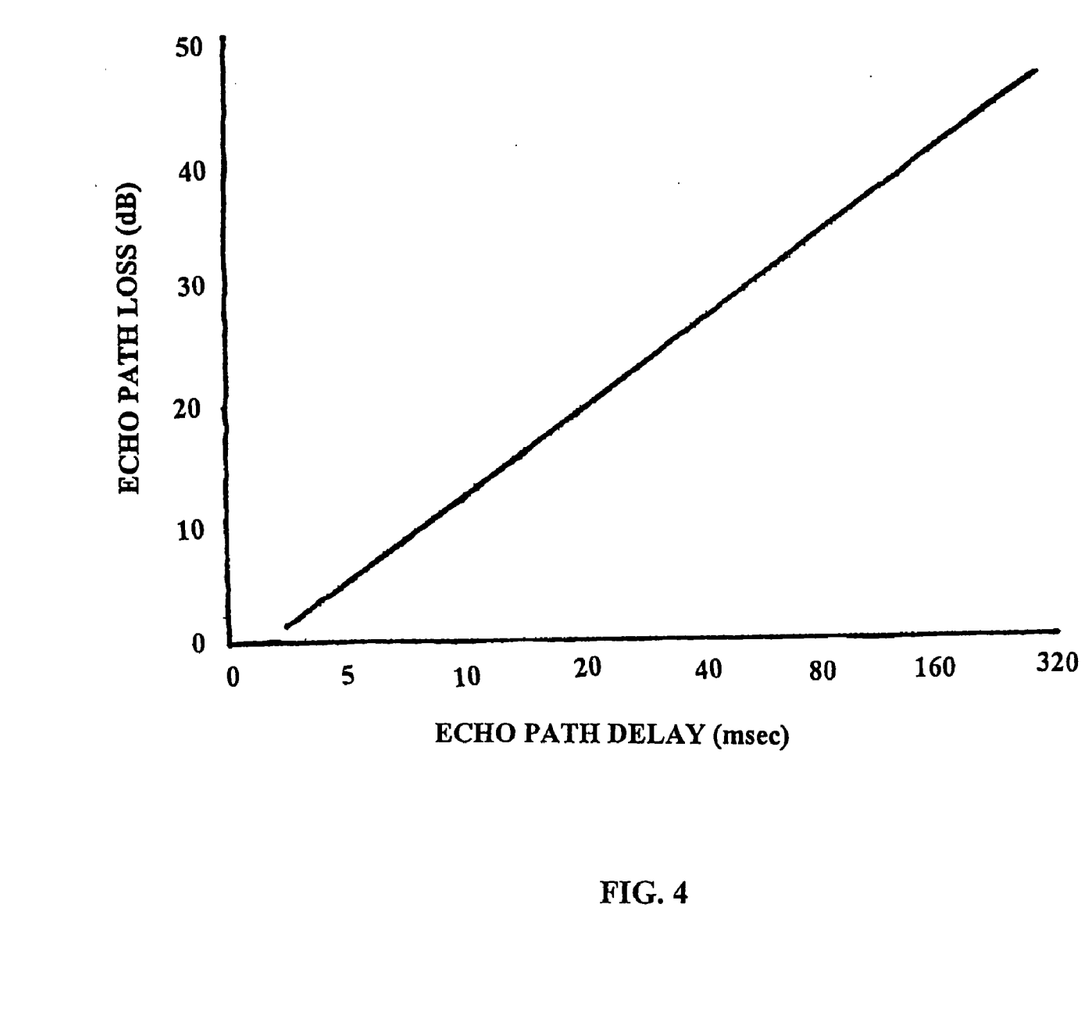
FIG. 4 is a diagram of acceptable and unacceptable echo in a telecommunication network.

The telephone 14 is in a first location, such as San Jose, and the telephone 30 is in a second location, such as Montreal. A user of telephone 14 in San Jose may experience an echo problem when connected to the telephone 30 in Montreal. Echo is typically created when the tail circuit 18 in Montreal allows some of the audio signal from a transmission audio path 32 to leak into the audio signal on a return audio path 34. The leaking audio signal in the return audio path 34 is represented by a dotted line 36 and is perceived as echo at the San Jose telephone 14. The echo is produced by impedance mismatches in the telecommunication network. The echo is a function of how much energy is reflected back to the telephone 14 and the time delay between the original signal on audio path 32 and the reflected signal 36 on the return path 34. FIG. 4 illustrates the generally accepted boundary between acceptable and unacceptable echo. As shown in FIG. 4, user perception of echo is aggravated by circuit delay including tail circuit delay and transmission channel delay. The tail circuit 18 represents the electrical equipment, such as PBXs, telephones, microphones, transformers, etc., at the far end of the phone call to the right of the gateway 26. The tail circuit 18 shown in FIG. 1 includes any equipment in Montreal that creates the echo signal 36.

Figure 2:
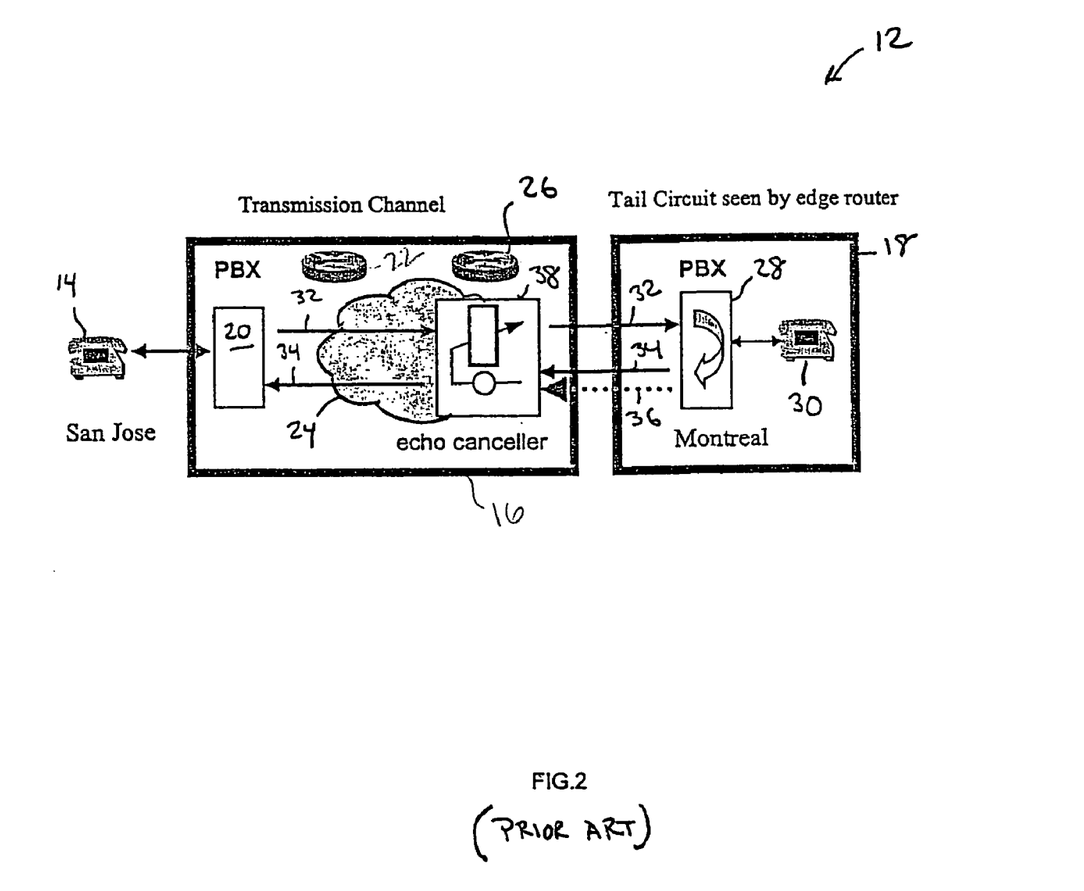
FIG. 2 is a prior art diagram of the telephone network of FIG. 1 including an echo canceller.

Referring to FIG. 2, the standard solution for eliminating echo is to introduce an echo canceller 38 in the transmission channel 16. In the case of the network shown in FIG. 2, the echo canceller 38 is included in the packet voice gateway 26 on the Montreal end of the tail circuit 18. The echo canceller 38 is controlled by management systems within the gateway 26. Alternatively, the echo canceller 38 is a standalone product.

At a first end, the packet voice gateway 22 converts audio signals from the PBX 28 into voice packets for sending over the packet switched network 24 to gateway 26. At a second end, the packet voice gateway 26 converts voice packets back into audio signals for sending to PBX 28. Echo cancellers are used in both traditional circuit switched networks, such as used in tail circuit 18, and packet switched networks, such as network 24.

The echo canceller 38 eliminates echo by modeling the measured echo on individual voice channels, subtracting the measured echo (echo replica) from the reflected signal, continuously adapting to the echo (convergence), recognizing the difference between echo and speech, and disabling echo cancellation when modems are used. The echo canceller 38 is typically a four-terminal device containing an adaptive Finite Impulse Response (FIR) filter (not shown). The FIR filter starts with zero knowledge about the system it is connected to, in this case, the tail circuit 18. By listening to the transmitted speech signal 32 and the echo signal 36 returning from the tail circuit 18, the adaptive filter in echo canceller 38 dynamically modifies filter coefficients to rapidly form an internal, functional model of the tail circuit 18.

Using this internal recipe, the echo canceller 38 produces a sample by sample estimate of the echo signal 36. This estimated echo signal is subtracted from the real echo signal 36. As the internal model in the echo canceller 38 improves over time in converging on the echo signal 36, attenuation of the echo signal 36 increases. As a result, the echo canceller 38 attenuates the echo signal 36 that normally returns to the phone 14 in San Jose while allowing the audio signal 34 from a talker at phone 30 to pass through.

Figure 3:
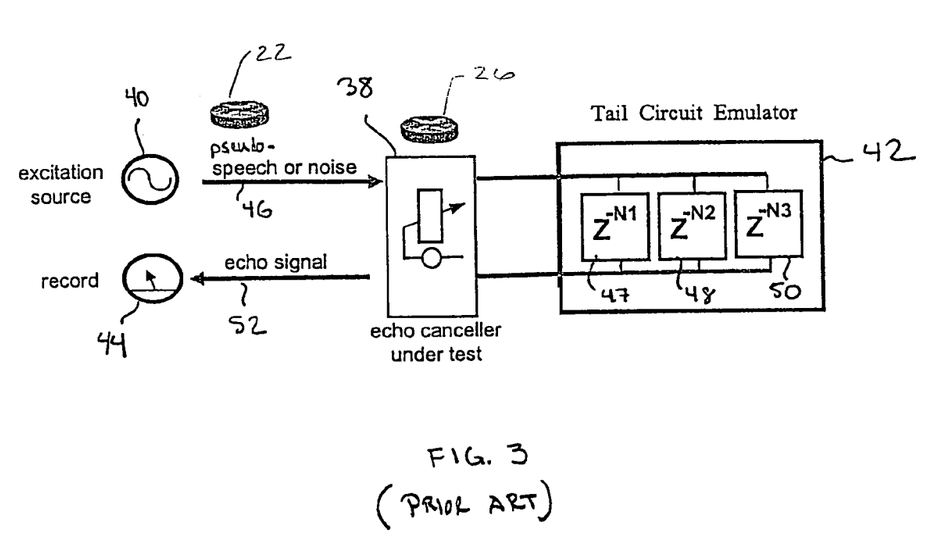
FIG. 3 is diagram showing a prior art system for testing an echo canceller.

FIG. 3 represents a traditional echo canceller performance testbed, as described in International Telecommunications Union (ITU) specifications G.165 and G.168. The echo canceller 38 has four audio terminals. A prerecorded test signal 46 generated at excitation source 40 is input to the echo canceller 38 under test. ITU specification G.165 specifies inputting a white noise test signal 46 and ITU specification G.168 employs a variety of different test signals 46 including a pseudo-speech signal. A tail circuit emulator 42 includes a set of parallel audio delay lines 47, 48, and 50 that provide a simple three-reflector model of three different echo delays and associated echo amplitudes. Echo of the speech or noise signal 46 is generated by the tail circuit emulator 42 and fed back into the echo canceller 38. An audio recorder 44 records the level of the returning echo signal 52 allowed to pass through the echo canceller 38.

In both ITU specifications, the performance of the echo canceller 38 is rated on a purely objective standard. The performance of the echo canceller 38 is rated based on a number of parameters including the convergence time required to attenuate the echo signal 52 to a predefined threshold, i.e., the time required to alternate the echo signal to a certain level. In other words, the less echo signal received by the recorder 44, the better the rated performance of the echo canceller 38.

A problem exists when using the G.165 and G.168 standards for measuring echo canceller performance. Implementing the G.165 and G.168 standards require precise control of the echo canceller 38 relative to the generation and transmission of the test signal and subsequent recordation of the returned echo signal 36. For example, the convergence test described in the G.168 standard requires initial clearing of the H-register—adaptive filter coefficients within the echo canceller that store the impulse response model of the echo path- and inhibiting adaptation. Adaptation is then enabled 50 ms before the start of a test signal burst (G.168 standard). In the G.165 standard, adaptation is enabled 500 ms after being disabled and after the test signal 46 is removed.

The test signal 46 is generally input at voice packet gateway 22 a first end of the transmission channel 16. The echo canceller 38, however, is controlled by the voice packet gateway 26—if the echo canceller is part of the gateway 26—at a second end of the transmission channel 16. Accordingly, meeting the strict timing requirements of the G.165 and G.168 standards is difficult because the test signal 46 must travel through uncharacterized and often variable delay paths that do not synchronize with the control of the echo canceller 38. Also, the gateway 26 internal management systems do not have the timing precision required by the G.165 and G.168 standards to configure the echo canceller.

The same problem exists when the echo canceller 38 is a standalone product. This is because control of the stand alone echo canceller 38 resides in its internal management system that is not synchronized with the generation of the test signal 46.

Accordingly a need remains for more effectively testing echo canceller performance.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 5:
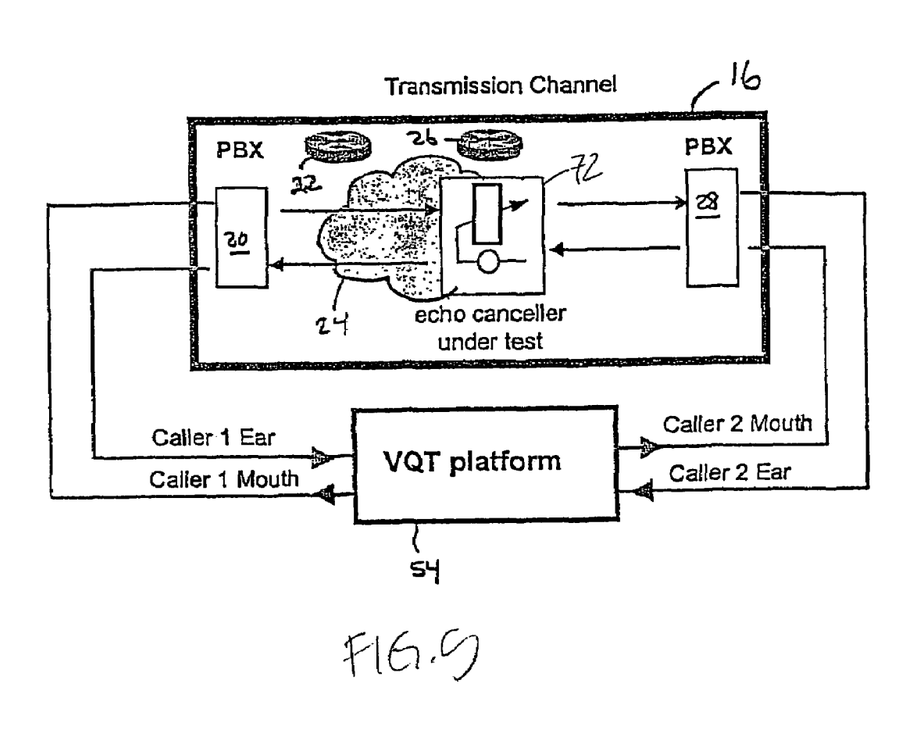
FIG. 5 is a diagram of a Voice Quality Test (VQT) platform according to the present invention.

FIG. 5 is a schematic of a Voice Quality Test (VQT) platform 54 used for testing an echo canceller 72. The VQT platform 54, in one embodiment, is a personal computer with additional audio and signal processing hardware that allows telephone calls to be established, and audio signals to be generated and recorded across a network. The echo canceller 72 under test is located inside the transmission channel 16 between PBX 20 and PBX 28. The echo canceller 72 is either incorporated into the gateway 26 or a standalone product. When the echo canceller 72 is part of the gateway 26, the gateway controls the echo canceller. That is, the gateway's 26 management systems configure the echo canceller 72 during testing. When the echo canceller 72 is a standalone product, the echo canceller's control software layer configures the echo canceller during testing. For purposes of the foregoing description, the echo canceller 72 is assumed to be part of the gateway 26.

The VQT platform 54 is connected to the transmission network via a 4-wire interface that may be Ear and Mouth, T1/E1, or packet-based (Ethernet). FIG. 5 shows an Ear and Mouth interface. The VQT platform 54 originates and terminates a call between the two telephony interfaces of the transmission network under test.

In FIG. 5, a left side interface of the VQT platform 54 is marked caller 1. The caller 1 interface goes off-hook and dials up caller 2 on the right side interface of the VQT platform 54. Caller 2 answers the call. Once the call has been established, audio signals flow between the caller 1 interface and the caller 2 interface. The VQT platform 54 controls the four signal nodes (caller 1 mouth/ear and caller 2 mouth/ear) which originate and terminate audio signals. The caller 1 interface and the caller 2 interface may reside on the same VQT platform 54, or on two separate VQT platforms.

Figure 6:
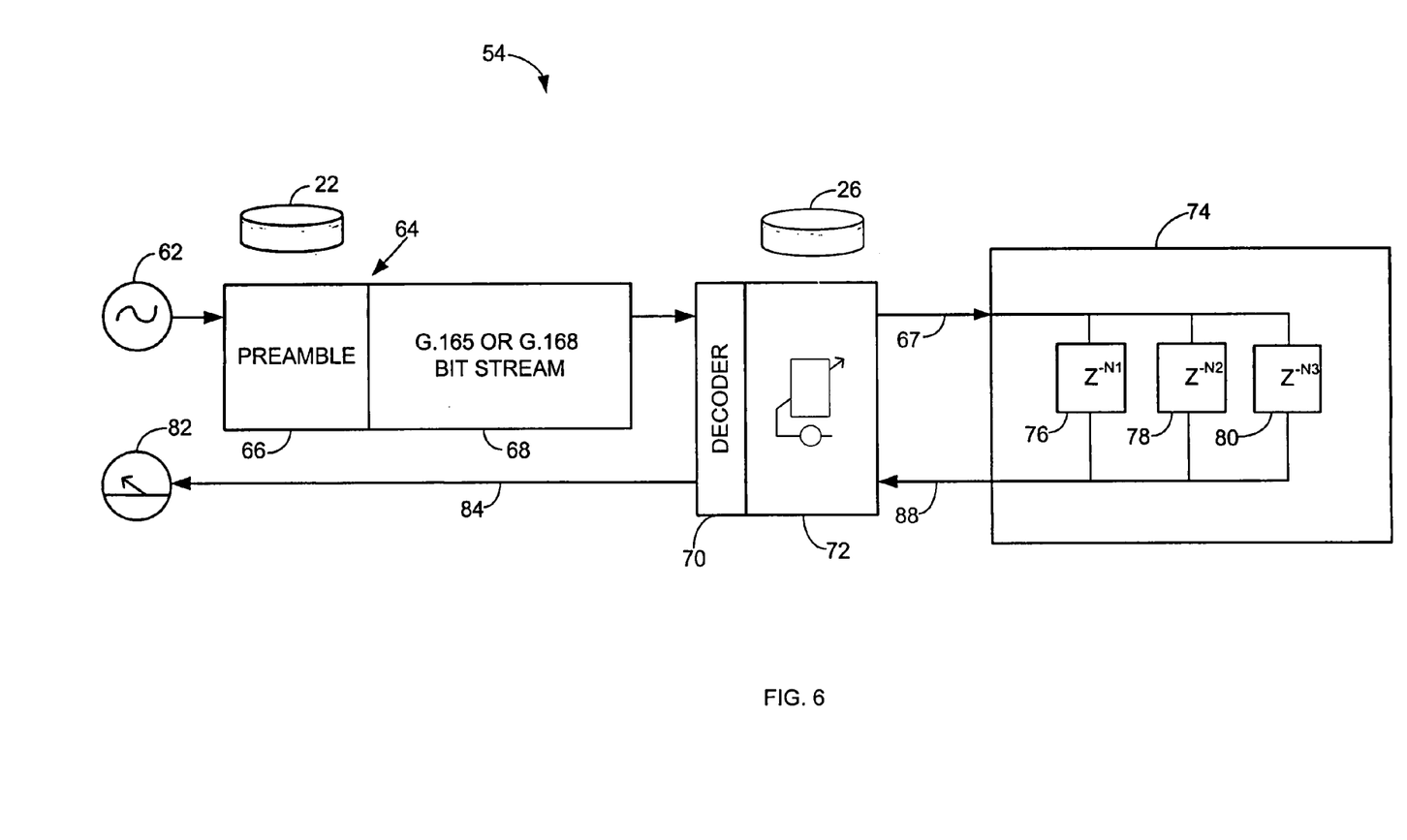
FIG. 6 is a detailed diagram of one embodiment of the VQT platform shown in FIG. 5.

FIG. 6 is a more detailed version of the VQT platform 54 shown in FIG. 5. The caller 1 side includes a signal generator 62 for generating the excitation signal 64 and a recorder 82 for recording an echo signal 84 processed through the echo canceller 72. The caller 2 side of the VQT platform 54 includes a tail-circuit emulator 74. The tail circuit emulator 74 emulates the input-output relationship seen if a phone call was actually placed to a real tail circuit, for example, in Montreal. The tail circuit emulator 74 is defined generally as a three-reflector model as described in the ITU-T G.165 and G.168 standards.

A signal 88 emerging from the caller 2 mouth node is a superposition of several delayed and attenuated versions of a signal 67 entering at the caller 2 ear node. The signal 88 is the echo signal generated as a result of impedance mismatches in the network. The echo canceller 72 generates the signal 84 by attenuating and processing the echo signal 88. During testing, the VQT platform 54 takes predetermined performance measurements, e.g., convergence time or returned echo level, of the signal 84 processed through the echo canceller 72 and recorded by recorder 82.

The signal generator 62, recorder 82, and tail circuit emulator 74 are functional blocks that can be implemented in discrete hardware components or implemented with software within the same personal computer. The software, in turn, can be implemented in a computer readable medium, e.g., a floppy disk. The implementation of the recorder 82 and tail circuit emulator 74 is known to those skilled in the art and are therefore are not described in further detail.

The signal generator 62 generates the excitation signal 64 provided to the echo canceller 72 during testing. The excitation signal 64 includes a preamble portion 66 that generally precedes a test signal portion 68. As described previously, the ITU-T G.165 standard requires the test signal portion 68 of the excitation signal 64 be white noise. In the ITU-T G.168 standard, the test signal portion 68 is pseudo-speech or a composite source signal, among other types of test signals. The test signal portion 68 under both ITU standards has a unique signature associated with it, e.g., a unique power spectrum. The preamble portion 66 is a sequence—such as a pulse code modulated sequence—capable of being differentiated from the test signal portion 66 by echo canceller 72. For example, the preamble portion 66 can have a different power spectrum than the applied test signal portion 68. The preamble portion 66 is designed so that the probability of a non-test excitation signal (i.e., a normal speech signal) containing an identical preamble is practically zero. By so designing the preamble portion 66, the embedded test control in the echo canceller 72 is always active.

The excitation signal 64 is provided to a decoder 70 in the echo canceller 72. The decoder 70 detects the presence of the preamble portion 66 and then decodes it. The preamble portion 66 includes in-band, encoded, information related to configuring and controlling the echo canceller 72 during testing. For example, the preamble portion 66 identifies the type of test—e.g. convergence or double talk—to be performed on the echo canceller 72 and the type of test signal—e.g., noise or pseudo noise—to be provided by the signal generator 62.

As mentioned above, the ITU-T G.165 and G.168 standards include a variety of different tests that attempt to characterize the performance of the echo canceller under test. Generally, each performance test requires that the echo canceller be initialized, the test signal be applied, and a performance measurement be taken a predetermined time after the test signal is applied. The convergence test in the G.165 and G.168 standards, for example, ensures that the echo canceller converges rapidly for all combinations of input signal levels and echo paths and that the returned echo level—echo signal 84—is sufficiently low. In the convergence test, the echo canceller is initialized by clearing the H-register, inhibiting adaptation, and enabling/disabling the non-linear processor. In the G.165 standard, adaptation is disabled 500 ms after it is enabled. The combined loss is measured sometime thereafter. In the G.168 standard, adaptation is enabled 50 ms before the start of a test signal 68 burst. The combined loss is measured at this time.

A strength of the present invention is that the preamble portion 66 allows precise control of the echo canceller 72 during testing by synchronizing the test control to the location of the preamble 66. This allows exacting control of the echo canceller 72 during testing to within a single sample time of the excitation signal 64, e.g., 125 microseconds.

The preamble 66 provides the necessary information to configure and control the echo canceller 72 as required by the ITU-T G.165 and G.168 standards. In one embodiment, the preamble 66 includes information identifying the type of test to be performed and configuring the echo canceller 72 responsive to the test identification. For example, a user wishes to perform the convergence test under the G.168 standard. The signal generator 62 generates an excitation signal 64 including a preamble 66 that identifies the test as the convergence test and identifies the test portion 68 as a pseudo-noise signal as required by the G.168 standard. The echo canceller 72 receives the excitation signal 64 and decodes the preamble portion 66 using decoder 70. The decoded preamble portion 66 instructs the echo canceller to clear the H-register, inhibit adaptation, and enable/disable the non-linear processor. The decoded preamble portion 66 instructs the echo canceller 72 to manage the timing associated with the test. That is, the decoded preamble portion 66 instructs the echo canceller 72 to enable adaptation 50 ms before the start of a test portion 68 burst and takes the necessary performance measurement—combined loss in this case.

The signal generator 62 and decoder 70 are functional blocks that can be implemented in discrete hardware components or implemented with software. The software implementing the signal generator 62 would then run on a personal computer and the software implementing the decoder 70 would run on the echo canceller 72 according to the above-described operation. In either case, the software, in turn, can be implemented in a computer readable medium, e.g., a floppy disk.

Figure 7:
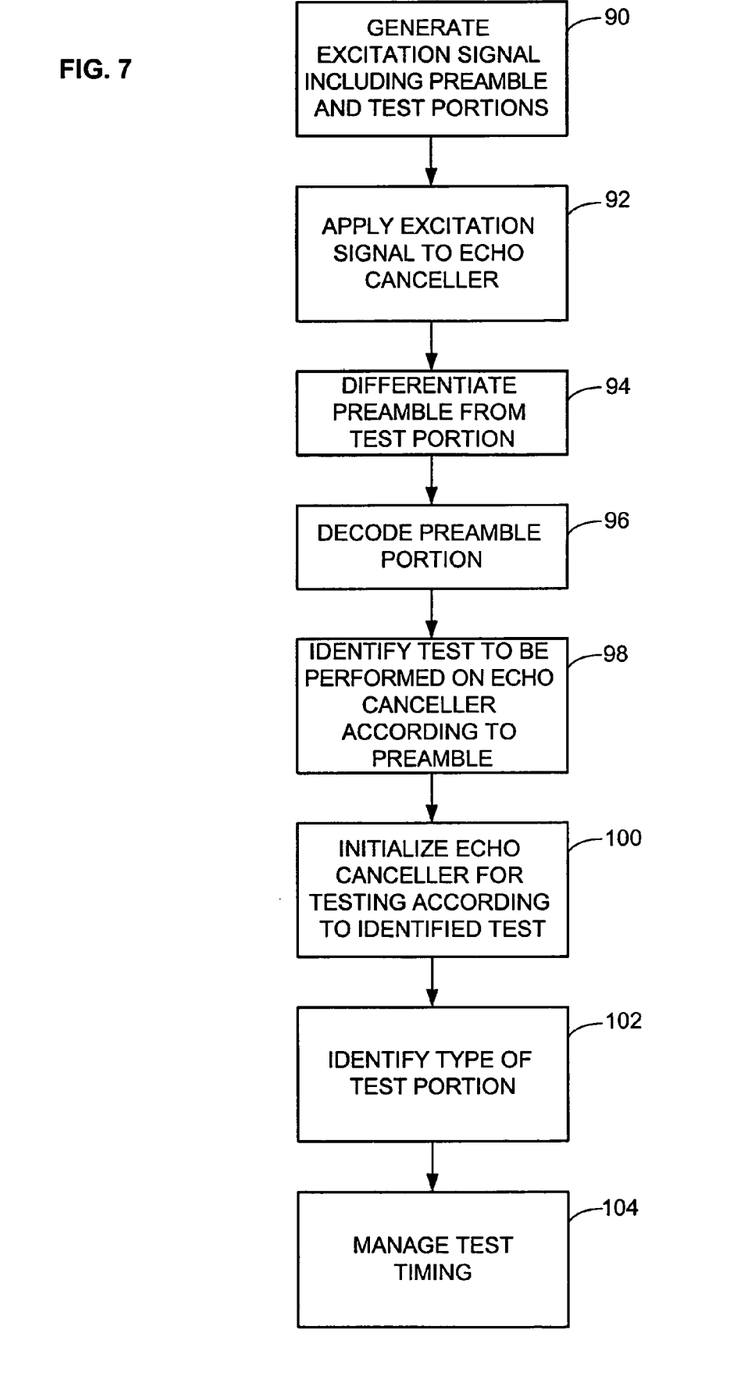
FIG. 7 is a flowchart of the operation of the VQT platform shown in FIG. 6.

The VQT platform operates as shown in FIG. 7. The signal generator 62 generates an excitation signal including a preamble portion and a test portion at block 90. The excitation signal is applied to the echo canceller at block 92. The preamble portion is differentiated from the test portion (block 94) and decoded (block 96). The decoded preamble portion identifies the test to be performed to the echo canceller at block 98, e.g., convergence or double talk test. The echo canceller then configures or initializes for testing, including but not limited to clearing the H-register, inhibiting adaptation, and enabling/disabling the non-linear processor if necessary (block 100). The preamble identifies the type of test portion to the echo canceller at block 102. A performance measurement is taken at a predetermined time after receiving the excitation signal according to the performance test identified by the preamble portion.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A method for testing an echo canceller, comprising:
   generating a packetized excitation signal including a preamble portion and a test portion, the generating occurring external to the echo canceller;
   encoding the test portion with a digital representation of a test signal;
   encoding the preamble portion with configuration information relating to the echo canceller;
   transmitting the packetized excitation signal to the echo canceller as a packetized digital signal through a packet network; and
   configuring the echo canceller in a test configuration responsive to the configuration information in the preamble portion.

2. The method of claim 1 including taking a performance measurement responsive to the preamble portion.

3. The method of claim 2 comprising measuring a combined loss a predetermined time before receiving the test portion.

4. The method of claim 1 including encoding instructions in the preamble portion that when executed by the echo canceller result in inhibiting adaptation and clearing a register in the echo canceller.

5. The method of claim 1 comprising encoding instructions in the preamble portion that when executed by the echo canceller result in disabling a processor in the echo canceller.

6. The method of claim 5 including taking a performance measurement responsive to the preamble portion.

7. The method of claim 5 including encoding instructions in the preamble portion that when executed by the echo canceller result in inhibiting adaptation and clearing a register in the echo canceller.

8. The method of claim 5 including encoding a test identifier in the preamble portion.

9. The method of claim 5 including encoding the preamble portion in such a way as to be capable of being differentiated from the test portion.

10. The method of claim 5 including measuring a combined loss a predetermined time before receiving the test portion.

11. The method of claim 1 including encoding a test identifier in the preamble portion.

12. The method of claim 1 encoding a test signal identifier in the preamble portion.

13. The method of claim 1 including encoding the preamble portion in such a way as to be capable of being differentiated from the test portion.

14. A method of testing an echo canceller, comprising:
   receiving a packetized excitation signal generated externally to the echo canceller, the excitation signal including a preamble portion and a test portion, where the test portion is encoded with a digital representation of a test signal;

decoding the preamble portion after receiving the excitation signal from a network;

configuring the echo canceller in a test configuration responsive to the decoded preamble portion; and controlling the echo canceller during testing responsive to the decoded preamble portion.

15. The method of claim 14 including:
inhibiting adaptation in the echo canceller responsive to the preamble portion; and
clearing a register in the echo canceller responsive to the preamble portion.

16. The method of claim 14 disabling a processor in the echo canceller responsive to the preamble portion.

17. The method of claim 16 including:
inhibiting adaptation in the echo canceller responsive to the preamble portion; and
clearing a register in the echo canceller responsive to the preamble portion.

18. The method of claim 16 including identifying a test to be performed on the echo canceller responsive to the preamble portion.

19. The method of claim 16 including identifying a type of test signal responsive to the preamble portion.

20. The method of claim 16 including differentiating the preamble portion from the test portion.

21. The method of claim 16 including controlling the echo canceller during testing to within a single sample time of the excitation signal.

22. The method of claim 16 including controlling the echo canceller during testing to within 125 microseconds.

23. The method of claim 14 including identifying a test to be performed on the echo canceller responsive to the preamble portion.

24. The method of claim 14 comprising identifying a type of test signal responsive to the preamble portion.

25. The method of claim 14 including differentiating the preamble portion from the test portion.

26. The method of claim 14 including controlling the echo canceller during testing to within a single sample time of the excitation signal.

27. The method of claim 26 including controlling the echo canceller during testing to within 125 microseconds.

28. The method of claim 14 including disabling a processor in the echo canceller responsive to the preamble portion.

29. The method of claim 14 including identifying a type of test signal responsive to the preamble portion.

30. A system for testing an echo canceller comprising:
signal generating means for generating a packetized excitation signal including a preamble portion and a test portion, the signal generating means being external to the echo canceller, where the test portion is encoded with a digital representation of a test signal;
transmitting means for transmitting the excitation signal from the signal generating means to the echo canceller as a packetized digital signal through a packet network; and
controller means for configuring the echo canceller in a test configuration and controlling the echo canceller during testing according to the preamble portion;
wherein the preamble portion identifies a type of test.

31. The system of claim 30 including:
tail circuit emulating means for generating an echo back signal responsive to the test portion of the excitation signal; and
recording means for recording any received echo signal allowed to pass through the echo canceller.

32. The system of claim 30 wherein the preamble portion sets timing associated with performance tests defined in ITU-T G.165 and G.168 standards.

33. The system of claim 30 wherein the preamble portion identifies a performance test.

34. The system of claim 30 wherein the preamble portion is a correlated pulse code modulated sequence capable of being differentiated from the test portion of the excitation signal.

35. A system for testing an echo canceller, comprising:
signal receiving means for receiving a packetized excitation signal transmitted as a packetized digital signal over packet a network, the excitation signal including a preamble portion and a test portion, where the test portion is encoded with a digital representation of a test signal;
decoding means for obtaining configuration information by decoding the preamble portion; and
configuring the echo canceller in a test configuration responsive to the decoded preamble portion.

36. The system of claim 35,
wherein the echo canceller includes an H-register and a non-linear processor and
wherein the configuration information includes any of the following:
instructions related to the management of the H-register;
instructions related to the management of the non-linear processor;
instructions related to an adaptation function in the echo canceller; and
timing information related to any of the aforementioned instructions.

37. The system of claim 35 wherein the decoding means differentiates the preamble portion from the test portion.

38. The system of claim 35 wherein the decoding means:
inhibits adaptation in the echo canceller responsive to the preamble portion; and
clears a register in the echo canceller responsive to the preamble portion.

39. The system of claim 35 wherein the decoding means disables a processor in the echo canceller responsive to the preamble portion.

40. The system of claim 35 wherein the decoding means controls the echo canceller during testing to within a single sample time of the excitation signal.

41. The system of claim 35 where the decoding means identifies a test type in the test portion.

42. A system for testing an echo canceller, comprising:
a signal generator for generating a packetized excitation signal external to the echo canceller, the excitation signal including a preamble portion and a test portion, where the test portion is encoded with a digital representation of a test signal;
a transmitter for transmitting the excitation signal from the signal generator to the controller as a packetized digital signal via a packet network; and
a controller for configuring the echo canceller in a test configuration and controlling the echo canceller during testing responsive to the preamble portion.

43. The system of claim 42 including:
a tail circuit emulating for generating an echo back signal responsive to the test portion of the excitation signal; and
a recorder for recording any received echo signal allowed to pass through the echo canceller.

44. The system of claim 42 wherein the preamble portion sets timing associated with performance tests defined in ITU-T G.165 and G.168 standards.

45. The system of claim 42 wherein the preamble portion identifies a performance test.

46. The system of claim 42 wherein the preamble portion is a correlated pulse code modulated sequence capable of being differentiated from the test portion of the excitation signal.

47. The system of claim 46 including:
a tail circuit for generating an echo back signal responsive to the test portion of the excitation signal; and
a recorder for recording any received echo signal allowed to pass through the echo canceller.

48. The system of claim 47 wherein the decoding means controls the echo canceller during testing to within 125 microseconds.

49. The system of claim 46 wherein the preamble portion sets timing associated with performance tests defined in ITU-T G.165 and G.168 standards.

50. The system of claim 46 wherein the preamble portion identifies a type of test portion.

51. The system of claim 46 wherein the preamble portion identifies a performance test.

52. The system of claim 42 wherein the preamble portion identifies a type of test portion.

53. An echo canceller, comprising:
a receiver for receiving a packetized excitation signal from a packet network, the excitation signal being generated external to the echo canceller and including a preamble portion and a test portion, where the test portion is encoded with a digital representation of a test signal; and
a decoder for decoding the preamble portion, the decoded preamble portion configuring the echo canceller in a test configuration during testing.

54. The echo canceller of claim 53 wherein the decoder differentiates the preamble portion from the test portion.

55. The echo canceller of claim 53 wherein the decoder extracts control information from the preamble portion and wherein the controller controls the echo canceller responsive to the control information.

56. The echo canceller of claim 53 wherein the preamble portion identifies a test to be performed on the echo canceller.

57. The echo canceller of claim 53 wherein the preamble portion identifies the test portion.

58. A computer readable medium having stored thereon instructions, that, when executed by a computing device, result in:
generating a packetized excitation signal having a preamble portion and a test portion;
encoding the test portion with a digital representation of a test signal;
transmitting the excitation signal to an echo canceller as a packetized digital signal through a packet network;
configuring the echo canceller in a test configuration responsive to the preamble portion after transmitting; and
controlling the echo canceller responsive to the preamble portion after transmitting.

59. The computer readable medium of claim 58 comprising
measuring a combined loss a predetermined time before receiving the test portion.

60. The computer readable medium of claim 59 including encoding information identifying a type of test portion in the preamble portion.

61. The computer readable medium of claim 58 including encoding information identifying a type of test in the preamble portion.

62. The computer readable medium of claim 58 comprising encoding information identifying a type of test portion in the preamble portion.

63. The computer readable medium of claim 58 including encoding the preamble portion such that it is distinguishable from the test portion.

64. The computer readable medium of claim 58 including measuring a combined loss a predetermined time before receiving the test portion.

65. The computer readable medium of claim 58 comprising measuring a performance parameter a predetermined time before application of the test portion.

66. A computer readable medium having stored thereon instructions, that, when executed by a computing device, result in:
receiving a packetized excitation signal generated external to an echo canceller and transmitted as a packetized digital signal through a packet network, the excitation signal including a preamble portion and a test portion, where the test portion is encoded with a digital representation of a test signal;
decoding the preamble portion, the preamble portion configuring the echo canceller during testing; and
configuring the echo canceller in a test configuration responsive to the configuration information in the preamble portion.

67. The computer readable medium of claim 66 including:
inhibiting adaptation in the echo canceller responsive to the preamble portion; and
clearing a register in the echo canceller responsive to the preamble portion.

68. The computer readable medium of claim 66 including identifying a test to be performed on the echo canceller responsive to the preamble portion.

69. The computer readable medium of claim 66 comprising identifying a type of test signal responsive to the preamble portion.

70. The computer readable medium of claim 69 including:
inhibiting adaptation in the echo canceller responsive to the preamble portion; and
clearing a register in the echo canceller responsive to the preamble portion.

71. The computer readable medium of claim 69 including identifying a test to be performed on the echo canceller responsive to the preamble portion.

72. The computer readable medium of claim 69 including differentiating the preamble portion from the test portion.

73. The computer readable medium of claim 66 including differentiating the preamble portion from the test portion.

74. The computer readable medium of claim 66 including identifying a type of test signal responsive to the preamble portion.

75. The computer readable medium of claim 66 comprising
disabling a processor in the echo canceller responsive to the preamble portion.

* * * * *

UNITED STATES PATENT AND TRADEMARK OFFICE
CERTIFICATE OF CORRECTION

| | | |
|---|---|---|
| PATENT NO. | : 6,931,101 B1 | Page 1 of 1 |
| APPLICATION NO. | : 09/579719 | |
| DATED | : August 16, 2005 | |
| INVENTOR(S) | : Wildfeuer | |

It is certified that error appears in the above-identified patent and that said Letters Patent is hereby corrected as shown below:

At column 8, line 19, please replace "over packet a network" with --over a packet network--

At column 8, line 26, please replace "to the decoded preamble portion" with -- to the configuration information in the preamble portion--

Signed and Sealed this

Twenty-ninth Day of August, 2006

JON W. DUDAS
*Director of the United States Patent and Trademark Office*